W. S. IREY.
COOKING APPARATUS.
APPLICATION FILED APR. 26, 1910. RENEWED FEB. 14, 1911.
1,007,700. Patented Nov. 7, 1911.
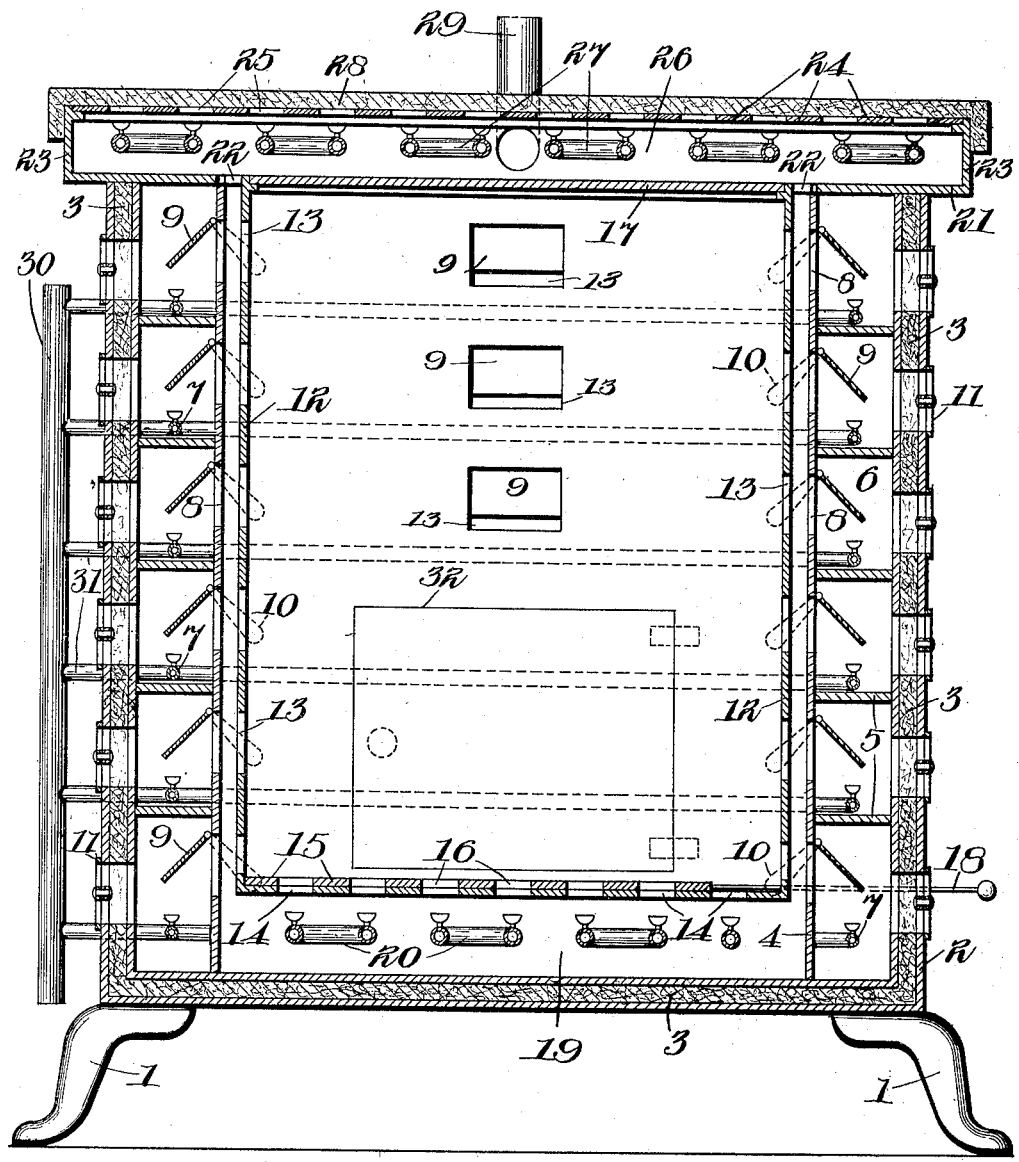

UNITED STATES PATENT OFFICE.

WILLIAM S. IREY, OF SAN FERNANDO, PAMPANGA, PHILIPPINE ISLANDS.

COOKING APPARATUS.

1,007,700.     Specification of Letters Patent.     Patented Nov. 7, 1911.

Application filed April 26, 1910, Serial No. 557,821. Renewed February 14, 1911. Serial No. 608,598.

*To all whom it may concern:*

Be it known that I, WILLIAM S. IREY, a citizen of the United States, formerly a resident of Mexico, Pampanga, Philippine Islands, now residing at San Fernando, Pampanga, Philippine Islands, have invented certain new and useful Improvements in Cooking Apparatus, of which the following is a specification.

The object of my invention is to produce a small apparatus which can be heated by denatured alcohol or similar heating fluid, which may be used either as an oven or as a cooking stove, and one in which the amount of heat supplied can be nicely regulated at every part of the apparatus.

With these objects in view, my invention consists in the construction and combinations of parts as hereinafter described and claimed.

In the accompanying drawing, the figure is a vertical cross section of a cooking apparatus constructed in accordance with my invention.

The apparatus supported upon legs 1, consists of an outside wall preferably provided with an asbestos lining 3. Parallel to the sides 2 are partitions 4, the construction upon each side being the same, and the space between the partitions and the wall is divided by shelves or cross partitions 5, into chambers 6, in each of which is located one or more burners 7. The partition 4 is provided with a series of openings 8, one for each chamber 6, which opening may be closed by a swinging valve 9, operated by a handle 10, shown in dotted lines, located outside the stove. Each chamber is provided with a sliding door or damper 11.

12 represents the oven which is provided with a series of openings 13, located opposite the openings 8. In its bottom, the oven is provided with a series of openings 14, and this bottom is provided with a sliding plate 15, provided with a series of openings 16, so that the bottom of the oven may be left open, as shown in the figure, or closed as desired. The top of the oven is closed by a removable plate 17. The plate 15 may be moved back and forth by means of a handle 18 extending through the side of the apparatus and connected to the plate 15. Underneath the oven is space 19 in which are located a number of burners 20.

Resting on the top of the apparatus is a plate 21, cut away centrally to allow the oven 12 to be dropped into position, said oven being supported by suitable lugs resting on the plate 21. The perforation in the plate 21 is made large enough so as to leave spaces 22 around the oven, so that the products of combustion may be passed upwardly into the top of the stove. The plate 21 has its edges bent upward, as shown at 23, and has its upper end open, and on a ledge of this upper end, is adapted to fit, a perforated plate 24, having openings 25 therein. In the space 26 between the plates 21 and 24 are located a number of burners 27, said burners being located directly under the openings 25. The covering 28 of asbestos is adapted to be placed over the plate 24.

29 represents a flue for the products of combustion, which is connected with the space 26.

30 represents a supply pipe communicating with a tank (not shown) containing the liquid fuel and communicating by means of branch pipes, such as 31, with the various burners, means (not shown) being, of course, employed to cut off the supply of fuel to any one of the burners.

The ends of the oven may be made substantially similar in construction to the sides, already described, but, of course, some means must be provided, such as a door 32, to afford access to the interior of the oven.

The construction described affords a very easy means of cooking with a very small expenditure of fuel and is especially adapted for cooking in hot climates. The apparatus being principally incased in an insulating wall prevents the heat from being dissipated, thus effecting a saving of fuel as well as adding to the effectiveness of the apparatus. By the use of the separate burners and dampers, the heat may be regulated with great nicety, for example, the bottom, sides, top and ends, of the oven may be heated, if desired, or any part thereon, and the oven may be heated by direct heat, the products of combustion passing directly therethrough, or the walls of the oven may be heated as usual. Furthermore, the top of the stove, after removing the cover 28, may be used as an ordinary cooking stove.

I claim:

1. In a cooking apparatus, the combination of a central oven provided with openings in its sides, a series of heating chambers located around said oven, each of said chambers being provided with an opening in its side providing communication with the oven, and a valve for closing each of said last named openings and separate heating means in each of said chambers, substantially as described.

2. In a cooking apparatus, the combination of a central oven and heating means disposed above, below and around said oven, and comprising chambers each containing a burner or burners and each of said chambers having an opening communicating with the air and another opening located in proximity to said oven and an insulated covering for the whole apparatus, substantially as described.

3. A cooking apparatus comprising insulated walls, bottom and top, partitions arranged parallel to said walls, shelves dividing the spaces between said walls and partitions into a series of chambers, each of said chambers being provided with a side opening and a valve for each of said openings, each of said chambers being also provided with separate heating means, and an oven inside of said apparatus, separated from said chambers by definite spaces, said oven having openings in its bottom and a sliding perforated plate adapted to close said openings, substantially as described.

In testimony whereof, I have signed my name to this specification in the presence of two subscribing witnesses.

WILLIAM S. IREY.

Witnesses:
 MOISES TIDALGO,
 FRANCISCO EUSTAIN.

Copies of this patent may be obtained for five cents each, by addressing the "Commissioner of Patents, Washington, D. C."